Nov. 3, 1936.　　　　D. REID　　　　2,059,395
CLOSABLE CONTAINER
Filed Dec. 1, 1932
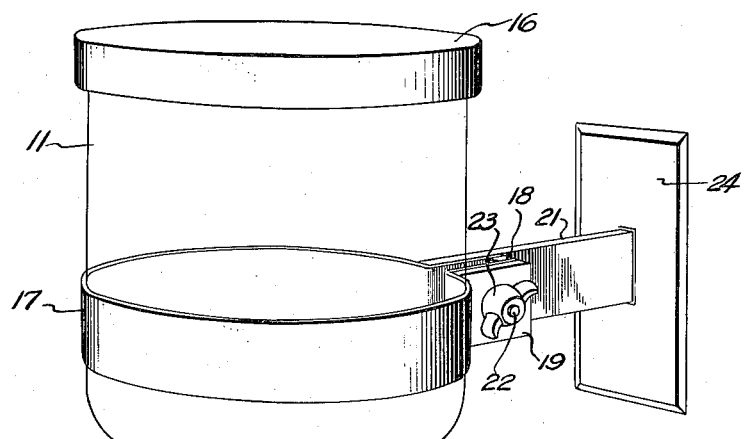
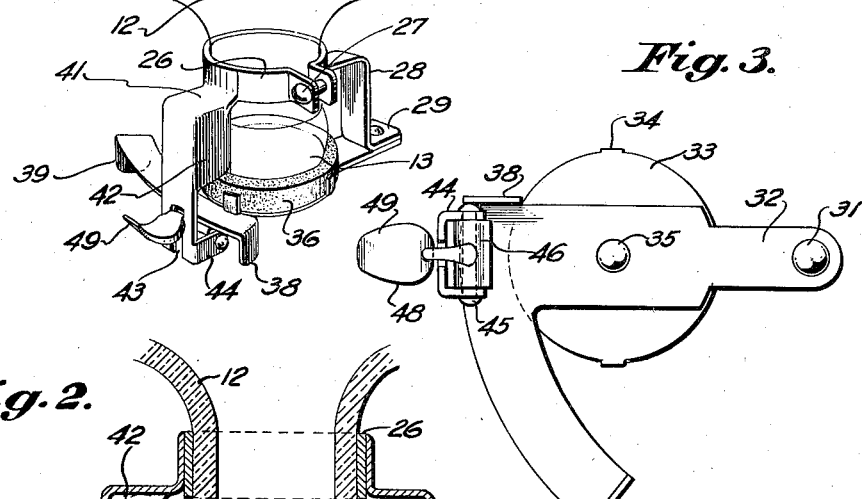
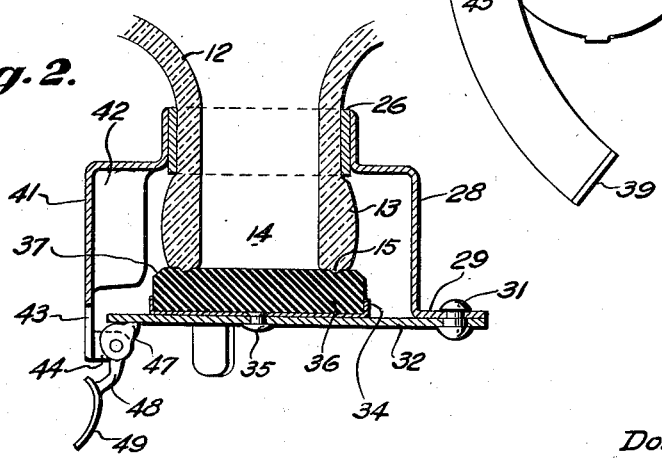
Inventor
Donald Reid
Albert R Henry
Attorney Patented Nov. 3, 1936

2,059,395

UNITED STATES PATENT OFFICE 2,059,395

CLOSABLE CONTAINER

Donald Reid, Buffalo, N. Y.

Application December 1, 1932, Serial No. 645,320

6 Claims. (Cl. 215—65)

This invention relates to closable containers, and it has particular reference to a closure member for a container which can be manipulated at will either to close the mouth of the container securely or to open the container for access to its contents.

The present invention will be described with reference to a container particularly adapted for the dispensing of materials such as ground coffee, as is desirable in a household or kitchen utensil, but it will be understood that certain aspects of the invention may be applied in other relations and that, except as specified in the appended claims, it is not intended to limit the invention to this use alone, nor to restrict the same to the details of the practical form thereof described herein for exemplary purposes.

The invention has among its objects the provision of a container which may be utilized for the storing and intermittent dispensing of various materials, and which container is provided with a closure member that is simple in construction and operation, but which nevertheless forms a positive and effective seal for the mouth of the container, preventing the egress of the contents thereof or the ingress of air. One form of the invention is illustrated in the accompanying drawing wherein:

Fig. 1 is a perspective illustrating the invention as applied to a household dispensing apparatus;

Fig. 2 is a cross-section on an enlarged scale of the closure member assembled with a container; and Fig. 3 is a bottom plan view of the closure member shown in Figs. 1 and 2.

Referring first to Fig. 1, the invention provides for a container 11 herein illustrated as being in the form of a glass bottle having a reduced end or neck portion 12 provided with a shoulder 13 terminating in an open mouth 14. As shown best in Fig. 2, it will be observed that the mouth 14 is formed with an annular bead or bevel portion 15 projecting slightly beyond the plane of the mouth for a purpose which will be hereinafter explained. The bottle 11 is illustrated as being formed with an open upper end covered by a removable plate or cover member 16, by means of which access may be had to the interior of the container for replenishing its contents. A strap member 17 encircles the container 11 and its two ends 18 and 19 are secured to each other and to a bracket arm 21 by means of a common bolt 22 and nut 23. The bracket arm 21 is connected to a wall plate 24 by means of which the entire unit may be mounted in a kitchen cabinet or on the kitchen wall or other accessible place. If the bottle is not provided with a cover plate 16, and its contents are to be replenished through the mouth 14, it is best to form the bracket arm 21 in such fashion that it may be readily rotated on or detached from the wall plate 24, thereby avoiding the necessity of loosening the strap 17 for each refilling operation.

Assuming that the container 11 is filled with material to be dispensed, such as ground coffee, sugar, or the like, reference will now be made to the closure member by means of which the bottle mouth 14 may be opened or closed at will. The closure member comprises a strap 26 encircling the neck 12 of the bottle and resting against the shoulder 13, being fixedly secured by means of a bolt and nut connection 27 passing through the ends of the strap. A bent arm 28 is secured to one side of the strap 26 and it projects first outwardly to clear the neck 13 and then downwardly and slightly beyond the plane of the mouth 14, terminating in a flat flange portion 29. A pivot pin 31 passing through an aperture formed in the flange 29 also passes through and secures for pivoted movement a cover plate 32, which is adapted to project across the mouth 14 of the container 11. A disc member 33 provided with upwardly extending flanges 34 is secured to the cover member 32 by means of a rivet 35, and this member is adapted to hold a resilient pad or rubber disc 36 which engages the open mouth 14 when the container is closed. It will now be noted that, when the pad 36 is pressed against the mouth of the bottle 14, the annular bead 15 is forced into the material of the pad to provide a tortuous path between the interior of the bottle and the exterior thereof. During opening or closing movement of the closure member, however, there is presented only a limited area of contact between the receptacle mouth and the disc 36, and hence the likelihood of brushing crumbs of material out of the bottle mouth by the opening or closing action is reduced to a minimum. It will also be noted that the edge portion of the pad 36 is beveled as indicated by the reference numeral 37, and this beveled edge reduces the tendency to sweep out or entrap crumbs, and prevents harsh contact between the mouth 14 and the pad 36 which might tend to destroy the soft material of which the pad is formed.

The pivotally mounted arm 32 is provided, adjacent the opposite side of the container 11, with finger pieces 38 and 39 which may be utilized to facilitate the opening and closing movements of the closure. These finger pieces are formed by extending the material of the member 32 along an arc, as illustrated in Fig. 3, and then bending the extremities of the arcuate section downwardly. When bent downwardly, as just described, the finger pieces 38 and 39 may also be utilized as limit stop members in cooperation with a second arm member illustrated in the several figures, the other purposes of which will now be described. Second arm member 41 is secured to the strap 26 at a point substantially diametrically opposite the arm 28. The arm 41 also projects outwardly to clear the shoulder 13, and, adjacent the shoulder it is formed with inwardly bent portions 42 serving as finger pieces and adapted to cooperate with the finger pieces 38 and 39 on the pivotally mounted closure member. The extremity of the arm 41 is formed with a slot 43 and a pair of inwardly bent portions 44 for mounting a latch member, by means of which the resilient pad 36 may be pressed firmly against the open mouth 14 of the receptacle. A pivot pin 45 extends between apertures formed in the flanges 44, and on it is mounted a rotatable member 46 formed with a projecting portion 47, and a lever portion 48 terminating in a finger piece 49. Referring to Figs. 1 and 2, it will be noted that when the finger piece 49 is moved in one direction as, for example, upwardly, the arm 48 enters the slot 43, and the cam member 47 is released from the edge of the cover plate 32. When moved in the opposite direction, however, the cam portion 47 is pressed against the closure member and thus causes the resilient pad 36 to engage snugly against the open mouth 14 of the bottle.

It will also be observed that, when the clamping member 47 is in its released position, as illustrated in Fig. 1, the closure member may be operated by pinching between the fingers the finger piece 39 and the visible finger piece 42. This operation moves the closure member away from the mouth of the receptacle, allowing the contents thereof to flow outwardly by means of gravity. By pinching the finger piece 42 against the finger piece 38, a closing action is obtained, and there is little likelihood of crumbs being swept out by the closure member during its movement, as the narrow edge of the bevel 15 tends to sweep such crumbs back into the mouth of the bottle, and over the surface of the resilient pad 36. When the pad is directly under the mouth of the bottle, movement of the finger piece 49 clamps the pad 36 tightly against the mouth of the bottle, to provide a substantially air-tight joint. A tight joint of this character has been found very desirable in a dispenser for foodstuffs such as coffee, sugar, and the like, since it excludes air or hygroscopic moisture which have the tendency of accelerating the deterioration of the container contents.

From the foregoing description it will be understood that the invention provides an inexpensive but effective closure for containers, and that the various features of the practical embodiment herein described are susceptible of such modifications and changes as are encompassed by the scope of the following claims.

I claim:

1. A closable container comprising a receptacle having an open end, a strap engaging said receptacle adjacent said open end, an arm projecting from said strap beyond said open end, a cover plate pivoted on said arm for sliding movement over said open end, a resilient pad secured to the under side of said plate adapted to engage said open end, finger pieces on said plate, a second arm projecting from said strap at a point remote from said first named arm, finger pieces formed on the second arm for cooperation with said finger pieces on said cover, and a clamping member rotatably mounted on the end of said second arm, said clamping member having a cam surface to press said resilient pad against said open end or release the same therefrom in accordance with the movement of said clamping member.

2. A closable container comprising a bottle having a shouldered neck and an open mouth, a strap encircling said neck adjacent said shoulder, arms projecting from said strap beyond said mouth, one of said arms being formed with a flat portion, a cover plate pivotally connected to said flat portion for sliding movement over said mouth, a resilient pad secured to said cover plate adapted to engage said mouth, said pad being formed with a beveled edge, finger pieces on said cover to facilitate the movement thereof, and a clamping member mounted on said second arm for engagement with said cover to press said pad against said mouth, said second arm being formed with finger pieces for cooperation with the finger pieces formed on said cover.

3. A closable container comprising a bottle formed with a neck portion having an axial opening therein, means for mounting the bottle in inverted position, a strap secured to the neck portion and having a pivot portion, a closure member for the neck opening mounted on said pivot portion for sliding movement transversely of the neck portion, a resilient pad secured to the closure member, an arm depending from said strap, and a latch mounted on said arm and movable into engagement with the closure member to spring it axially and to force said pad into sealing engagement with the neck opening.

4. A closable container comprising a bottle formed with a neck portion having an axial opening therein, means for mounting the bottle in inverted position, a closure member for the neck opening, a resilient pad secured to the closure member and lightly engaging the neck portion opening, a strap secured to the neck portion and having spaced depending arm members, one of said arm members having a pivotal connection with the closure member for mounting it for sliding movement across the neck portion opening, and a latch member mounted on the remaining arm member and movable into engagement with the closure member to spring it axially and thereby force said pad into sealing engagement with the neck portion.

5. A closable container comprising a bottle formed with a neck portion having an axial opening therein, means for mounting the bottle in inverted position, a strap secured to the neck portion and having a pivot portion, a closure member having one extremity mounted on the pivot portion for transverse movement relative to the neck axis, a pad secured to the closure member, an arm on the strap, and guide means on the arm diametrically opposed to the pivot portion for engaging the remaining extremity of the closure member and supporting it during transverse movement with the pad thereof in light contact with the neck opening.

6. A closable container comprising a bottle formed with a neck portion having an axial opening therein, means for mounting the bottle in inverted position, a strap secured to the neck portion and having a pivot portion, a closure member having one extremity mounted on the pivot portion for transverse movement relative to the neck axis, a pad secured to the closure member, an arm on the strap, guide means on the arm diametrically opposed to the pivot portion for engaging the remaining extremity of the closure member and supporting it during transverse movement with the pad thereof in light contact with the neck opening, and clamping means associated with said guide means for moving the closure axially and thereby to force the pad into tight sealing engagement with the neck portion opening.

DONALD REID.